(12) United States Patent
Hammer (10) Patent No.: US 8,407,235 B2
(45) Date of Patent: Mar. 26, 2013

(54) EXPOSING AND USING METADATA AND META-METADATA

(75) Inventor: Lars Hammer, Frederiksberg (DK)

(73) Assignee: Microsoft Corporation, Redmond, WA (US)

( * ) Notice: Subject to any disclaimer, the term of this patent is extended or adjusted under 35 U.S.C. 154(b) by 56 days.

(21) Appl. No.: 13/043,505

(22) Filed: Mar. 9, 2011

(65) Prior Publication Data

US 2012/0233186 A1   Sep. 13, 2012

(51) Int. Cl.
*G06F 17/30* (2006.01)
(52) U.S. Cl. .................... 707/755; 707/802; 715/764
(58) Field of Classification Search .............. 707/609, 707/805, E17.095, E17.102, 755, 802, 811, 707/E17.045; 703/1; 719/316; 717/104, 717/106; 715/764
See application file for complete search history.

(56) References Cited

U.S. PATENT DOCUMENTS

| | | | |
|---|---|---|---|
| 6,928,396 B2 * | 8/2005 | Thackston | 703/1 |
| 7,212,212 B2 * | 5/2007 | Cherdron | 345/581 |
| 7,284,196 B2 * | 10/2007 | Skeen et al. | 715/234 |
| 7,289,997 B1 * | 10/2007 | Kita et al. | 707/999.1 |
| 7,475,080 B2 | 1/2009 | Chowdbary et al. | |
| 2002/0013748 A1 | 1/2002 | Edmison et al. | |
| 2002/0035450 A1 * | 3/2002 | Thackston | 703/1 |
| 2003/0088543 A1 * | 5/2003 | Skeen et al. | 707/1 |
| 2006/0044318 A1 * | 3/2006 | Cherdron | 345/581 |
| 2006/0085489 A1 * | 4/2006 | Tomic et al. | 707/200 |
| 2006/0294153 A1 | 12/2006 | Kumar et al. | |
| 2007/0112851 A1 * | 5/2007 | Tomic et al. | 707/104.1 |
| 2007/0220415 A1 * | 9/2007 | Cheng et al. | 715/503 |
| 2008/0183725 A1 * | 7/2008 | Blakeley et al. | 707/100 |
| 2010/0131461 A1 * | 5/2010 | Prahlad et al. | 707/609 |
| 2010/0161648 A1 * | 6/2010 | Eberlein et al. | 707/769 |
| 2010/0211571 A1 * | 8/2010 | Prahlad et al. | 707/741 |

FOREIGN PATENT DOCUMENTS

WO    2006026636 A2    3/2006

OTHER PUBLICATIONS

Xin Xiang, Yuanchun Shi, and Ling Guo—"A Conformance Test Suite of Localized LOM Model"—Proceedings of the the 3rd IEEE International Conference on Advanced Learning Technologies (ICALT'03)—Jul. 9-11, 2003 (pp. 288-289).*

Christian Heide Damm, Klaus Marius Hansen, Michael Thomsen, and Michael Tyrsted—"Tool integration: experiences and issues in using XMI and component technology"—This paper appears in: Technology of Object-Oriented Languages, 2000. Tools 33. Proceedings. 33rd International Conference—IEEE 2000, (pp. 94-107).*

Hutson, Simon., "Microsoft Dynamics CRM as a Solution Development Framework", Retrieved at <<http://crmdynamics.blob.core.windows.net/builds/xrm.pdf>>, Architecture Whitepaper, Mar. 2010, pp. 1-21.

(Continued)

*Primary Examiner* — Anh Ly
(74) *Attorney, Agent, or Firm* — Hope Baldauff Hartman, LLC (57) ABSTRACT

Concepts and technologies are described herein for exposing and using metadata and for exposing meta-metadata in a tabularized format. Metadata associated with one or more ERP services is collected, parsed, and loaded into one or more sets of tables. The tables of metadata are exposed to software and/or devices to provide various functionality. The tables of metadata and meta-metadata data exposed in tabularized format are used at runtime, design time and/or at other times, and are used to provide various functionality. The tables of metadata and meta-metadata also are used to identify and track modifications made to one or more application objects associated with the ERP services, and to apply the modifications to new versions of metadata associated with the application objects.

14 Claims, 7 Drawing Sheets

OTHER PUBLICATIONS

"Metadata-Driven Data Integration", Retrieved at <<http://www.informatica.com/INFA_Resources/wp_metadata_di_6687_web.pdf>>, White Paper, Jan. 2007, pp. 16.

Staudt, et al., "The Role of Metadata for Data Warehousing", Retrieved at <<http://www.minet.uni-jena.de/dbis/lehre/ss2005/sem_dwh/lit/SVV99.pdf>>, Technical Report, 1999, pp. 1-32.

"Leveraging Meta-Data in the Data Warehouse Environment", Retrieved Apr. 29, 2010, from <<http://www.metaview360.com/pdf/leveragingmetadata/pdf>>, pp. 3.

"Exposing Data from ERP Systems through ODBC, OLE DB or JDBC", Retrieved at <<http://www.datadirect.com/products/openaccess/docs/exposing_complex_data.pdf>>, Data Direct Technologies, Apr. 2008, pp. 1-5.

* cited by examiner

EXPOSING AND USING METADATA AND META-METADATA

BACKGROUND

Some software such as some enterprise resource planning ("ERP") software stores metadata in binary large objects ("BLOBs"). These BLOBs of metadata can be stored in proprietary formats that are readable by program code in the internal runtime engine. In the case of some ERP software, the BLOBs of metadata are retrieved at runtime and used by the ERP software to provide various functionality. Because of the storage of the metadata in BLOBs and/or in proprietary formats, the metadata may be retrieved from storage and used at runtime, but otherwise may be protected from review, analysis, modification, and/or other access by entities or devices other than the ERP software.

Additionally, ERP software packages are generally heavily customizable, and users of the ERP software often expend large amounts of time and resources in tailoring the functionality of ERP software to suit their needs. ERP software vendors, as well as third party vendors, may develop and release add-ons or other components for the ERP software to provide various functionality. These add-ons and other components, as well as the ERP software itself, may be customized by a user to suit his or her needs.

With each release of the ERP software and/or the add-ons, the modifications made to tailor the ERP software and/or the add-ons to suit the user's needs may need to be made again. Tracking the changes made to the software, and (re-)implementing those changes in the new version of the software, can require large amounts of resources in terms of manpower, time, and/or computational resources.

It is with respect to these and other considerations that the disclosure made herein is presented.

SUMMARY

Concepts and technologies are described herein for exposing and using metadata and for accessing meta-metadata in a tabularized format. In accordance with the concepts and technologies disclosed herein, metadata associated with ERP services is collected and presented to a user in an open and up-to-date format. A toolset application is executed by an enterprise resource planning device to export a BLOB of metadata in a parseable format, and to parse the metadata elements from the BLOB of metadata to extract metadata elements from the metadata. As used herein, "meta-metadata" refers to data that defines or specifies valid content, structure, form, format, size, and/or other aspects of the metadata.

The metadata is identified and captured by the toolset application and loaded into one or more sets of tables. The meta-metadata also can be accessed and/or loaded into tables. This allows for an easy way to extend the meta-metadata, also referred to as the metamodel. More particularly, the metamodel can be extended by adding rows to the meta-metadata tables. These new rows in the metamodel tables will now define new types of metadata that can be instantiated as rows in the model tables. For the new metadata to be really useful, code that interprets these new types of model is typically written. The tables of metadata and meta-metadata are exposed to the ERP software and/or components thereof to provide enhanced ERP functionality, to track product evolution, and/or for other purposes.

According to various embodiments, the tables of metadata and meta-metadata tables are used not only at runtime, and not only by the ERP software, but also at design time and/or at other times, and can be used to provide customization information, to define types of data that may be entered into the tables of metadata, for cross-referencing data, for creating high-level tools on top of the ERP data, and/or for other purposes. In one embodiment, meta-metadata defining the notion of a modification between metadata is introduced as new rows in the metamodel tables. Then, the modifications between a baseline version and a modified version of metadata are computed and stored as modification metadata, and the determined modifications are applied to future iterations of the metadata. To enable computing and applying these modifications, specific code interpreting the new modification meta-metadata is written for that embodiment.

According to one aspect, an ERP device executes an ERP application for providing ERP services and an ERP design tool. The ERP design tool provides functionality for developing one or more application objects using design tools. As used herein, an "application object" refers to metadata for describing a form, web page, document, report, letter, program code, and/or other objects for providing particular functionality for an ERP service. The metadata describing the application objects and/or elements of the application objects, is stored in a data repository or other data storage location.

Meta-metadata defines the structure and constraints of the ERP metadata. The ERP metadata is stored in the data repository, and the meta-metadata is often hardcoded into design tools and runtime framework for the ERP application. The ERP metadata is stored in one or more BLOBs that are retrieved at runtime. The ERP application provides the ERP services based upon ERP data and the ERP metadata, based upon the hardcoded meta-metadata. In another embodiment, a reverse-engineering process for incrementally populating tables of meta-metadata based upon known occurrences of legal ERP metadata is used. In this context, "legal" refers to ERP metadata that abides by structure and constraints of the hardcoded meta-metadata. This approach allows extracting and storing the meta-metadata at a data storage location.

According to another aspect, the ERP device also executes a toolset application that is configured to parse the ERP metadata based upon and/or driven by the meta-metadata, and to store data elements parsed from the ERP metadata in one or more sets of tables. The tables can be stored in the data repository and/or exposed to the ERP device or other devices for use by the ERP application or other applications.

According to another aspect, the tables of ERP metadata and tables of meta-metadata are used to provide computation of modifications made between two versions of an application. A baseline version of contents of the ERP metadata is compared to a modified version of the ERP metadata corresponding to a modified version of the application. Data indicating one or more modifications, or differences between the two versions of the ERP metadata, is generated and stored by the toolset application. If a new baseline version of the application is obtained, the modifications can be applied to the new baseline version of the ERP metadata to obtain a new modified version of the application. Some modifications may conflict with changes made to the application between baseline versions, and therefore may not be automatically applied to the new baseline version of the application. Modifications that are not implemented, referred to herein as "residual modifications," can be tracked, and data indicating these residual modifications is stored or presented for action by a user.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for exposing and using metadata and meta-metadata. In accordance with the concepts and technologies disclosed herein, metadata associated with one or more ERP services is collected and presented to a user in an open and up-to-date format. A toolset application is executed by an enterprise resource planning device, enterprise resource planning software, and/or client-side devices and/or software to parse a BLOB of metadata, and to extract metadata elements and/or meta-metadata elements from the metadata.

The metadata and the meta-metadata are identified and captured by the toolset application and loaded into one or more sets of tables. The tables of metadata and meta-metadata are exposed to the ERP software and/or components thereof to provide enhanced ERP functionality, to track product evolution, and/or for other purposes. According to various embodiments, the tables of metadata and meta-metadata tables are used not only at runtime, and not only by the ERP software, but also at design time and/or at other times, and can be used to provide cross-reference information, customization information, and/or for other purposes. In one embodiment, the tables of metadata and meta-metadata are used to identify and track modifications or differences made between a baseline version of an application and a modified version of the application, and to apply the determined modifications to future iterations of the application.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for exposing and using metadata and meta-metadata will be presented.

Figure 1:
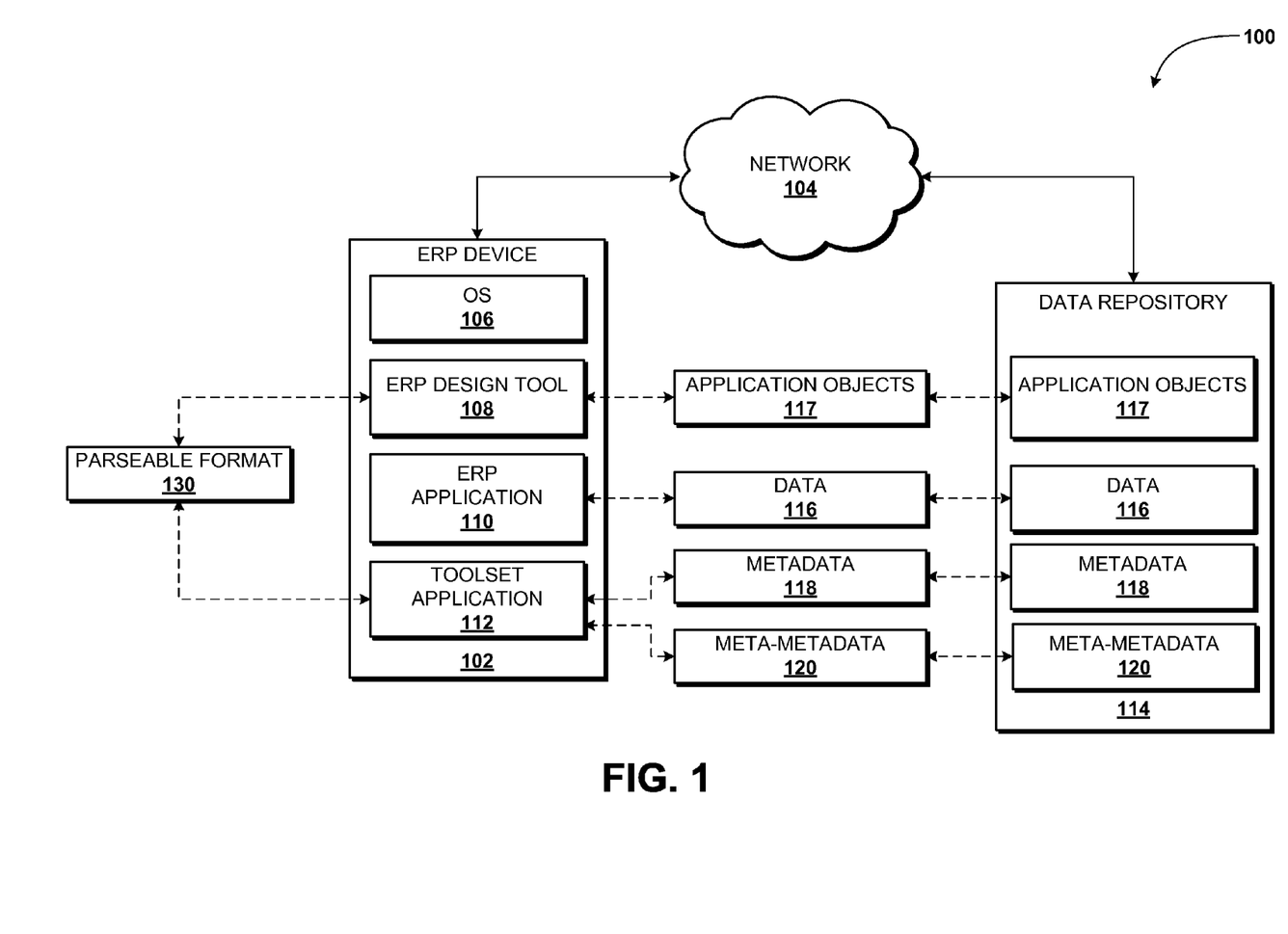
FIG. 1 is a system diagram illustrating a system for exposing and using data, metadata, and meta-metadata, according to exemplary embodiments.

Referring now to FIG. 1, aspects of a system 100 for exposing and using metadata and meta-metadata according to various embodiments presented herein will be described. The system 100 shown in FIG. 1 includes an enterprise resource planning ("ERP") device 102. The ERP device 102 is illustrated as operating on or in communication with a network 104, but this is not necessarily the case. According to various embodiments, the ERP device 102 is a server computer or a personal computer ("PC") such as a desktop, tablet, or laptop computer system. The ERP device 102 may include other types of computing systems including, but not limited to, handheld computers, netbook computers, embedded computer systems, and/or other computing devices. Thus, while the functionality of the ERP device 102 is described herein as being provided by a server computer, it should be understood that the concepts and technologies disclosed herein can be implemented on a client-side device and/or software executed thereon, as well as other devices, software, and/or network nodes.

The ERP device 102 is configured to execute an operating system 106 and one or more application programs such as, for example, an ERP design tool 108, an ERP application 110, a toolset application 112, and/or other application programs. The operating system 106 is a computer program for controlling the operation of the ERP device 102. The application programs are executable programs configured to execute on top of the operating system 106 to provide the functionality described herein for exposing and using metadata and meta-metadata. More particularly, the ERP application 110 uses application object definitions 117 and consumes and produces the ERP data 116. The toolset application 112 uses meta-metadata 120 and consumes and produces the ERP metadata 118. While the ERP application 110 and the toolset application 112 are illustrated as separate entities, it should be appreciated that these and other application programs can be seamlessly integrated to provide the functionality described herein. According to various embodiments, the system 100 further includes a data repository 114 configured to store data used by and/or generated by the ERP device 102. The functionality of the data repository 114 can be provided by various data storage devices including, but not limited to, databases, server computers, desktop computers, memory devices, other computing systems and/or components, and the like. In the illustrated embodiment, the data repository 114 is a database accessible to the ERP device 102. According to various embodiments, the ERP device 102 is configured to communicate with the data repository 114 via a direct link and/or via the network 104. In the illustrated embodiment, the ERP device 102 communicates with the data repository 114 via the network. It should be understood that this embodiment is exemplary.

As is described herein, the ERP application 110 is configured to provide one or more ERP services to users or devices in communication with the ERP device 102. According to some embodiments, the functionality of the ERP application 110 is provided by a server computer executing one or more members of the MICROSOFT DYNAMICS NAV family of products from MICROSOFT CORPORATION in Redmond, Wash. It should be understood that this embodiment is exemplary.

The ERP application 110 is configured to provide a user interface ("UI") for generating and storing business data relating to the ERP services, referred to herein as ERP data 116. The ERP design tool 108 is configured to provide one or more UIs for declaring the application object definitions 117 corresponding to data structures of application objects ("objects") used to provide various ERP service functionality. The application objects described by the application object definitions 117 can include, but are not limited to, tables, forms, reports, documents, UIs, web pages, program code, and the like, for generating, modifying, presenting, and/or enabling user interaction with the ERP data 116. Thus, the ERP design tool 108 can be used to define the application object definitions 117 corresponding to tables, forms, reports, documents, user interfaces ("UIs"), program code, other application objects, and the like for interacting with the ERP data 116. The ERP application 110 is configured to retrieve the ERP data 116 and the application object definitions 117 at runtime, and to render the forms, tables, reports, UIs, documents, web pages, and the like, and/or to execute the program code, to provide various ERP functionality.

The ERP design tool 108 also can be configured to generate metadata describing the application object definitions 117. For example, the application object definitions 117 can include metadata that describes the forms, tables, reports, web pages, UIs, documents, program code, and/or other application objects. According to various embodiments, the application object definitions 117 is stored in the data repository 114. In some embodiments, the application object definitions 117 is stored as one or more binary large objects ("BLOBs") in the data repository 114.

A "BLOB" is a collection of binary data stored as a single data entity, and can include program data, metadata, and/or executable program code. In some implementations, the BLOBs of application object definitions 117 are stored in one or more formats proprietary to the ERP application 110. Thus, while the BLOBs are stored in a format that is readily accessible and usable by the ERP application 110, the application object definitions 117 may not be readily analyzed or used for other purposes. Therefore, information corresponding to or reflected by the application object definitions 117 may not be usable by the ERP device 102, the ERP application 110, and/or other nodes or devices, other than to provide the particular ERP services described by the application object definitions 117.

It will be appreciated that the application object definitions 117 describes not only what types of data are stored as the ERP data 116 and/or formats in which data is stored as the ERP data 116, but also may describe the content, structure, and definitions of forms, UIs, tables, reports, documents, program code, and/or other application objects. Thus, an understanding of the application object definitions 117 may provide a user or device with an understanding of the ERP data 116 and/or the application objects, which may be valuable or useful for understanding the functionality provided by the exposed services as well as how users use or interact with the ERP services. In accordance with the concepts and technologies disclosed herein, the application object definitions 117 can be stored in a desired format, and the data format for the application object definitions 117 can be consistent for various types of application objects. As such, the concepts and technologies disclosed herein can be used to relieve a user from the need to master numerous languages and/or protocols including, but not limited to, C#, SQL, HTML, and the like, as otherwise may be required for a user to alter the application object definitions 117.

As will be described in more detail herein, the toolset application 112 is configured to provide the functionality described herein for exposing and using the application object definitions 117 in the form of tabularized ERP metadata 118. In some embodiments, the toolset application 112 is further configured to access and/or use meta-metadata 120 relating to the ERP metadata 118. The meta-metadata 120 can be exposed in a tabularized format, as will be described in more detail herein. The meta-metadata 120 describes the ERP metadata 118, and can detail, for example, how the ERP metadata 118 is structured, what types of data can be entered or used for certain values of the ERP metadata 118, other details, and the like. Thus, it will be understood that the meta-metadata 120 can specify and/or define the content, structure, and/or format of the ERP metadata 118, which in turn describes the content, structure, and/or format of the application objects for accessing and/or presenting the ERP data 116.

According to various embodiments, the toolset application 112 is configured to generate the meta-metadata 120 describing the ERP metadata 118, to parse the parseable format 130 and expose the ERP metadata 118 as data tables, and to expose the meta-metadata 120 as tables. According to various embodiments, the ERP design tool 112 is configured to export and import the application object definitions 117 into and from a parseable format 130 such as HTML format, XML format, text format, and/or other formats. The toolset application 112 is configured to parse the parseable format 130, and to load thus retrieved values from the application object definitions 117 into the ERP metadata tables 118. The tables are then made available to the ERP device 102 and/or other devices, software, and/or nodes to allow entities to analyze, use, and modify the ERP metadata 118 and/or the meta-metadata 120. An exemplary data structure for the ERP metadata 118 and the meta-metadata 120 is illustrated and described below with reference to FIG. 2, and exemplary UIs for presenting the ERP metadata 118 and the meta-metadata 120 are illustrated and described below with reference to FIGS. 3-4.

The toolset application 112 is further configured to export ERP metadata 118 into the parseable format 130, thereby enabling the ERP design tool 108 to import the contents of the ERP metadata 118 into its internal application object definitions 117. Thus, full interchangeability and equivalence is established between the internal application definitions 117 and the openly accessible tabularized ERP metadata 118. This means that any operation that can be performed on the ERP metadata 118 thru the toolset application 112 can now also be performed on the internal application object definitions 117 required by the ERP application 110 to provide its services.

As explained herein, storage and presentation of the tabularized ERP metadata 118 and the meta-metadata 120 allows users to create, modify, delete, or introduce objects by adding rows or otherwise modifying the ERP metadata 118 that describes the objects. Thus, users can interact with the tabularized ERP metadata 118, in addition to, or instead of interacting with the ERP design tool 108 via the UI for creating, modifying, deleting, or introducing the application object definitions 117.

The ERP metadata 118 and the meta-metadata 120 can be used to support various operations. For example, the ERP metadata 118 and the meta-metadata 120 can be used to determine changes between two or more versions of an application or application object. For example, a comparison of the ERP metadata 118 between a baseline version of the ERP metadata 118 and a modified version of the ERP metadata 118 can be made to determine changes made to an application, to objects of the application, and to values stored in the various objects of the application.

According to various embodiments, the toolset application 112 compares a baseline version of the ERP metadata 118 to a modified version of the ERP metadata 118, determines how the baseline version of the ERP metadata 118 has been modified, and captures data reflecting the determined changes ("modifications"). In some embodiments, the modifications are stored at the data repository 114 and/or exported into tables as ERP metadata 118. The modifications can be analyzed by application developers, add-on developers, users of the ERP services, and/or other parties for any desired purposes.

In some embodiments, the modifications are used to support updating of baseline versions of the ERP metadata 118. For example, an add-on for an ERP software package may include custom forms, reports, web pages, UIs, documents, letters, and the like, which can be defined by the ERP metadata 118 associated with the add-on. More particularly, the application objects associated with the add-on and the type of data that can be entered into the application objects at runtime can be described by the ERP metadata 118. A user of the add-on may further customize the ERP metadata 118 to suit his or her needs. As such, the baseline version of the ERP metadata 118 and a modified version of the ERP metadata 118 may be different. The differences between these versions of the ERP metadata 118 may be reflected by differences between a baseline version of the ERP metadata 118 and a modified version of the ERP metadata 118.

The toolset application 112 is configured by a set of meta-metadata and contains specific code to identify and capture these changes and store data describing the changes as modifications. According to various implementations, the meta-model is extended with a new application object type called "Modification." The new application objects of type "Modification," hereinafter referred to as "modifications," can contain any number of individual changes, each of the changes being described as a new element type, "Change," which uses properties to describe individual changes. These modifications can be used to support updating of future versions of the ERP metadata 118. For example, when a new version of the application is released, the modifications can be applied to the new version of the ERP metadata 118 to update the new version of the ERP metadata 118 in a manner consistent with the manner in which a user modified the previous baseline version of the ERP metadata 118. Thus, some steps for updating a new baseline version of the ERP metadata 118 can be automated.

According to some embodiments, the toolset application 112 is configured to determine if one or more of the modifications should be applied to the new baseline version of the ERP metadata 118. In some instances, the toolset application 112 can determine that a modification should not be applied to the new baseline version of the ERP metadata 118. For example, a user may modify a field of a form to increase the length of the input from 25 characters to 45 characters. The toolset application 112 is configured to apply this modification to a new baseline version of the ERP metadata 118 by identifying the field and modifying the field as specified by the modification. If, however, the field has been removed from the new baseline version of the ERP metadata 118, the toolset application 112 may determine that this modification should not be made because the field is missing. This example is illustrative of but one instance in which a modification may not be made. Other instances are contemplated including, but not limited to, instances in which the name of the field, the location of the field, the order of the fields, the beginning length of the filed, the type of data that may be input into the field, combinations thereof and the like, have been changed in the new baseline version of the ERP metadata 118 with respect to the previous baseline version of the ERP metadata 118.

When application of a modification to a new baseline version of the ERP metadata 118 fails for any reason, the toolset application 112 is configured to generate a "residual." In various implementations, any changes that cannot be applied to the baseline version of the ERP metadata 118 are copied from the modification into new application objects called "residuals," which can be stored in a manner similar to modifications as described herein. The toolset application 112 is also configured to present residuals to the user for action, and/or to store the residuals in a data storage location. In some embodiments, the toolset application 112 generates an error log that includes the residuals, and stores the error log in a data storage location accessible by the ERP device 102. A user can receive or access the residuals. In some embodiments, the user can manually modify the new version of the ERP metadata 118 or take other action, if desired. These and other features of the ERP device 102 are described in more detail herein.

FIG. 1 illustrates one ERP device 102, one network 104, and one data repository 114. It should be understood, however, that some implementations of the system 100 include multiple ERP devices 102, multiple networks 104, and/or multiple data repositories 114. Thus, the illustrated embodiments should be understood as being exemplary, and should not be construed as being limiting in any way.

Figure 2:
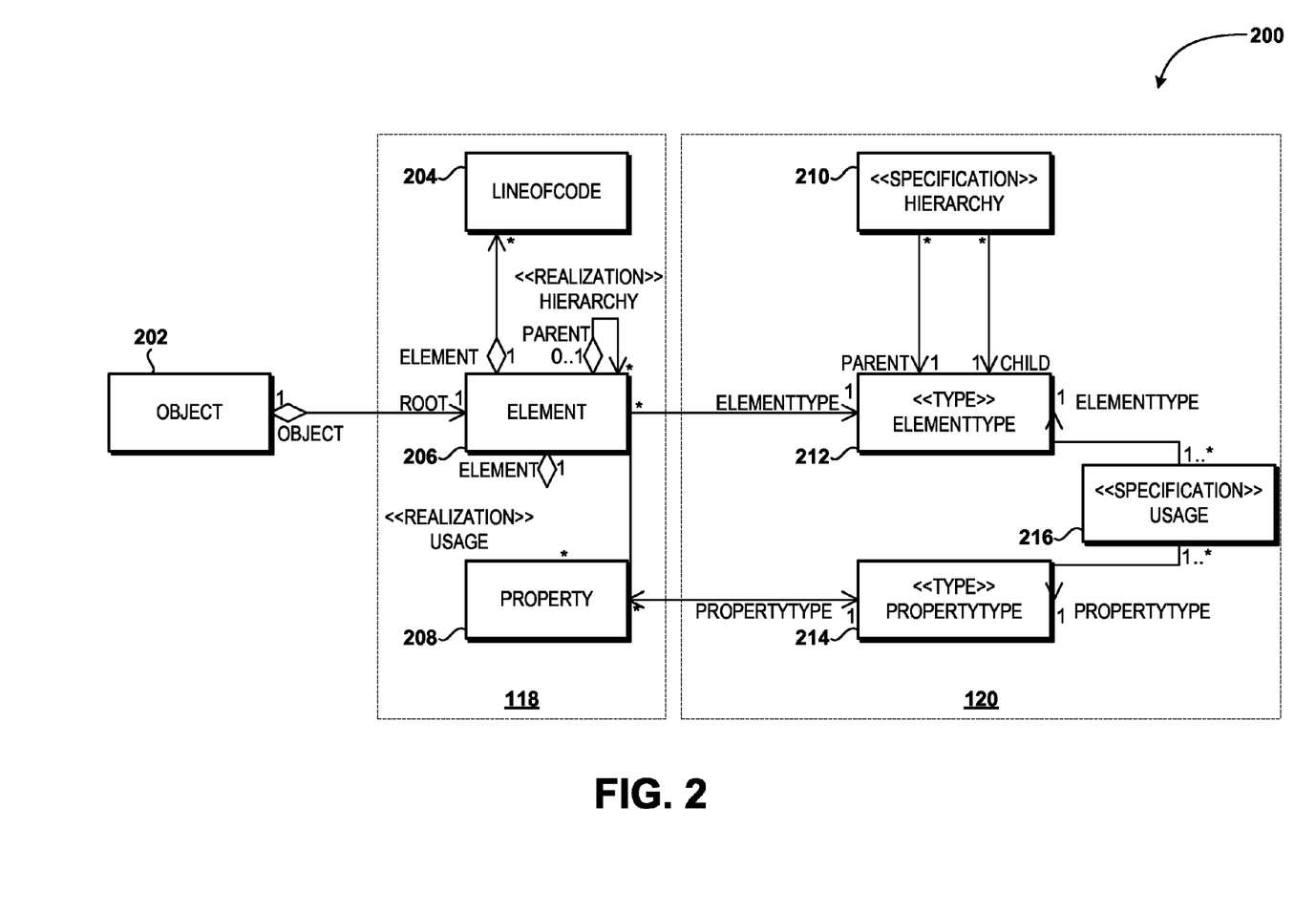
FIG. 2 is a data structure diagram that schematically illustrates an exemplary data structure for storing metadata and meta-metadata in tables, according to an exemplary embodiment.

Turning now to FIG. 2, additional aspects of the ERP metadata 118 and the meta-metadata 120 are described. In particular, FIG. 2 is a Unified Modeling Language (UML) diagram illustrating a data structure 200 for the ERP metadata 118 and the meta-metadata 120. According to various embodiments, the data structure 200 allows representation of the ERP metadata 118, which typically is represented as text, in a tabularized format that is accessible to users. The tabularized ERP metadata 118 is a complete representation of the ERP metadata 118, including code. Additionally, according to implementations the meta-metadata 120 is tabularized and complete. Thus, the concepts and technologies disclosed herein can be used to drive regularity of the tabular layout of the ERP metadata 118 and to provide for extensibility of the metamodel It should be understood that the illustrated data structure 200 is exemplary of a contemplated embodiment of the data structure 200, and should not be construed as being limiting in any way. The data structure 200 includes an administrative table 202 ("object"), corresponding to an index for storing information relating to the ERP metadata 118. In some embodiments, the object 202 stores an entry for each top-level element in the ERP metadata 118. This embodiment is exemplary. As mentioned above, the ERP metadata 118 referenced by the object 202 can be rendered at runtime by the ERP application 110 to provide forms, reports, UIs, documents, or the like, as set forth above.

As shown in FIG. 2, and as explained above, the object 202 can reference the ERP metadata 118, which is illustrated in FIG. 2 as a set of model tables. The ERP metadata 118 can define, for example, what elements are presented on a form, lines of code executed with a form, properties of elements of the form, combinations thereof, and the like. The elements can include, for example, drop-down menus, check boxes, input boxes, text boxes, captions, submit buttons, and the like. In the illustrated embodiment, the structure of the ERP metadata 118 includes a lineofcode table 204, an element table 206, and a property table 208.

As explained above, types of data and/or content thereof that can be stored in the ERP metadata 118 can be specified by the meta-metadata 120. Thus, values and other data are stored as the ERP metadata 118 in the model tables 204-208, while data describing what the values and other data relate to are stored as the meta-metadata 120. An exemplary structure of the meta-metadata 120 is illustrated in FIG. 2 by a set of metamodel tables that are associated with the model tables 204-208. The metamodel tables include a hierarchy table 210, an elementtype table 212, a propertytype table 214, and a usage table 216.

With reference to the tables 204-216, additional details of the ERP metadata 118 and the meta-metadata 120 can be understood. The element table 206 stores data defining the existence of the elements of an application object described in the ERP metadata 118. As will be more clearly understood with reference to FIGS. 3-4, the element table 206 can be presented including data looked up from the meta-metadata tables such as the elementtype table 212. Thus, for example, the element table 206 includes, in some embodiments, a type column populated via a lookup of the name of the element type from elementtype into the elementtype table 212. It should be understood that this embodiment is exemplary, and should not be construed as being limiting in any way.

The lineofcode table 204 stores data corresponding to program code linked to the elements such as those elements referenced in the element table 206. The property table 208 stores data defining properties of the application objects described by the ERP metadata 116. As will be more clearly understood with reference to FIGS. 3-4, the property table 208 can be presented including data looked up from the meta-metadata tables such as the propertytype table 214. Thus, for example, the property table 208 includes, in some embodiments, name and datatype columns populated via lookups from property type into the propertytype table 214. It should be understood that this embodiment is exemplary, and should not be construed as being limiting in any way. The hierarchy table 210 stores data that defines parent relationships allowed between the elements stored in the element table 206.

In an example wherein the ERP metadata 118 defines a form, a text box element for the form can be defined and represented in the element table 206. Thus, it will be understood that the meta-metadata 120 can store data defining the type, structure, and content of various properties for the text box element, though the actual data values corresponding to these and other data cannot be included in the meta-metadata 120 and instead can be stored in the tables corresponding to the ERP metadata 118.

The elementtype table 212 defines and names the allowed element types in the model 118. Some element types, also known as, application object types, define top-level elements, others define sub-elements thereof, and some define an element that holds a body of code. Thus each element in a valid model refers to its element type in the metamodel. The hierarchy table 210 specifies the allowed parent-child hierarchy of elements by referring to the parent element type and the child element type, and specifying the multiplicity of the parent-child relationship. For example, an entry in the hierarchy table 210 can define that an element of type Form can contain zero or more child elements of type Control. Another entry in the hierarchy table 210 can define that an element of type Form can hold an element with lines of code implementing the OnOpenForm trigger, which the ERP device 102 will call as part of opening that particular form. It should be understood that this embodiment is exemplary, and should not be construed as being limiting in any way.

The propertytype table 214 names and specifies the data type of each allowed property 208 in the model, and each entry in the usage table 216 specifies that a particular property type is allowed for a particular element type. For example, an entry in the propertytype table 214 can introduce a property type named Caption of data type text, and then an entry in the usage table 216 can define that an element of type Form can use that property type, meaning that for each element of type Form, it is allowed to enter a text value in the property table 208 for the caption of that form. It should be understood that this embodiment is exemplary, and should not be construed as being limiting in any way.

Figure 3:
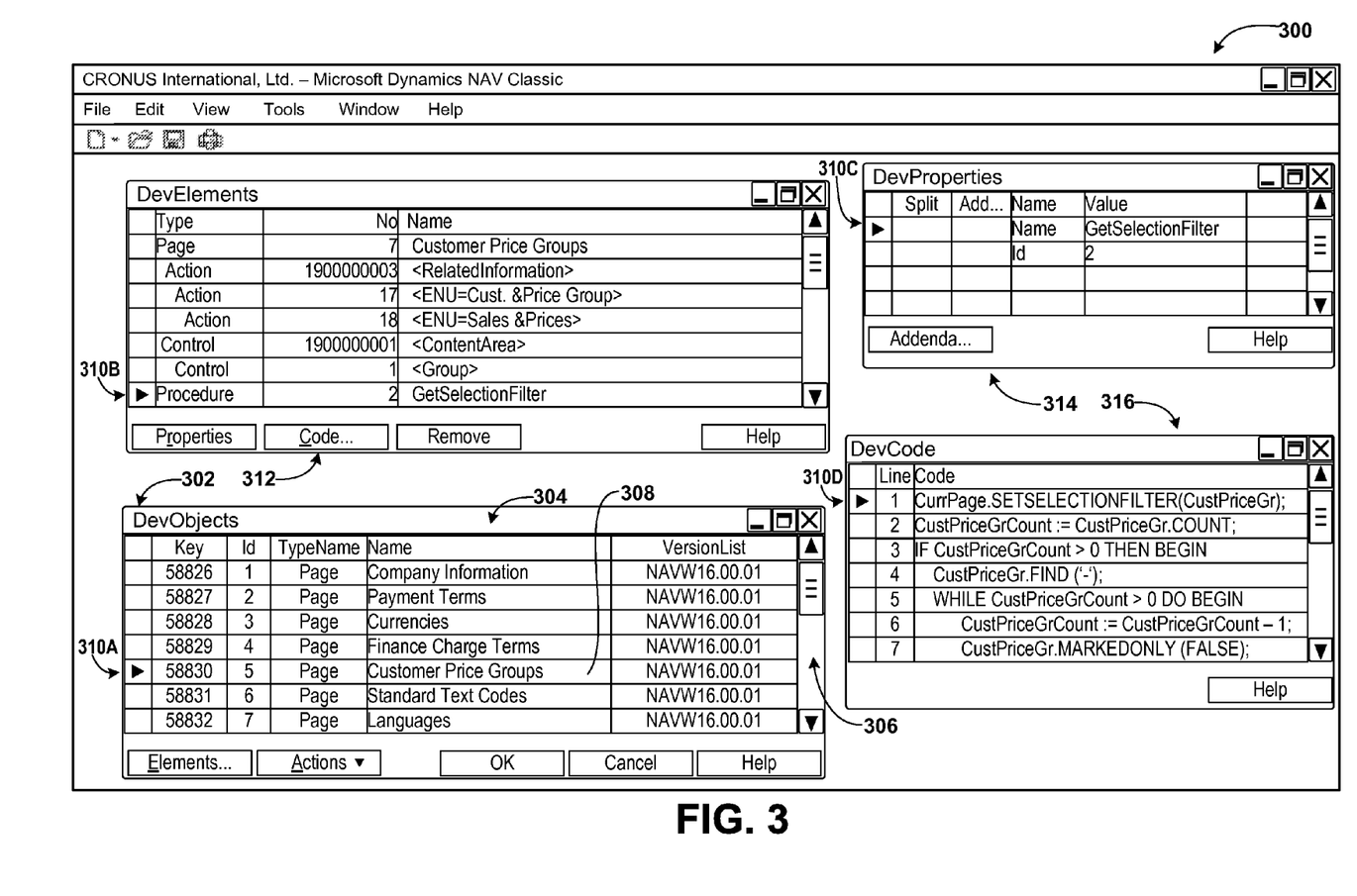
FIG. 3 illustrates a user interface for exposing metadata in tables, according to an exemplary embodiment.
Figure 4:
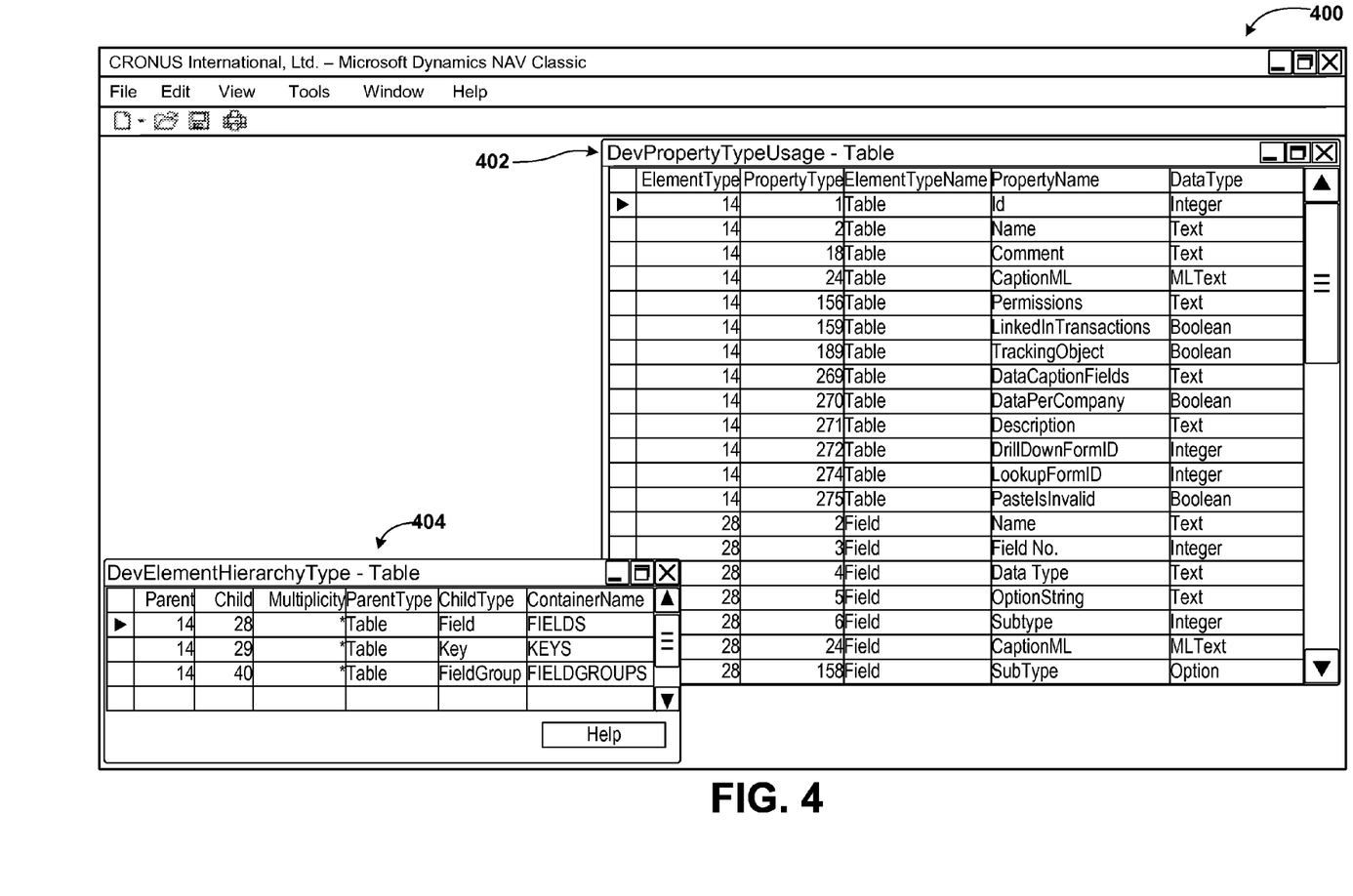
FIG. 4 illustrates a user interface for exposing meta-metadata in a tabularized format, according to an exemplary embodiment.

In some embodiments, as will be more clearly understood with reference to FIGS. 3-4, the usage table 216 can include columns populated by lookups into other meta-metadata tables such as the elementtype table 212 and the propertytype table 214. Thus, for example, the usage table 216 can include a elementtypename column populated via a lookup of elementtype into the elementtype table 212 and propertyname and datatype columns populated via lookups into the propertytype table 214 from propertytype. As mentioned above, the content of the metamodel tables 210-216 can be modified to alter the type, size, structure, and format of data represented by the model tables 204-208. Furthermore, modification of the content of the model tables 204-208 can change how the model is presented and/or used by the ERP application 110. User interfaces for presenting exemplary tables implementing the data structure 200 are presented below with reference to FIGS. 3-4.

Turning now to FIG. 3, a user interface 300 for exposing the ERP metadata 118 is illustrated, according to an exemplary embodiment. More particularly, the user interface 300 illustrated in FIG. 3 is used to expose the ERP metadata 118 in a tabularized format for interaction by a user. As shown, an objects table window 302 is presented to a user. The objects table window 302 exposes the ERP metadata 118, which as explained above can include data corresponding to application objects included in a particular project, add-on, package, and/or the like. The objects table window 302 can present data indicating some, all, or no ERP metadata 118 included in ERP services or one or more subsets of ERP services, depending upon user preferences and/or needs.

The objects table window 302 lists various named application objects including forms, reports, UIs, documents, letters, procedures, and the like. The names of the application objects are illustrated as being listed in a "Name" column 304. It should be understood that the illustrated object table window 302, the data presented therein, and the format of the object table window 302 are exemplary. Furthermore, it should be appreciated that additional data is presented via the object table window 302, but is not visible in the view illustrated FIG. 3. The additional data in the object table window 302 can be accessed by way of manipulating the scrollbar 306. Similarly, the other windows and data illustrated in FIG. 3 are exemplary, and may represent truncated or limited versions of the actual windows for the sake of simplifying the illustration and description of the concepts and technologies disclosed herein. Thus, the user interface 300 should be understood as being exemplary, and should not be construed as being limiting in any way.

In the illustrated embodiment, the user has selected the object indicated by the "Customer Price Groups" item 308 listed in column 304. As such, a highlighted record indicator 310A is displayed at the edge of the objects table window 302 to indicate to a user the row or record with which the user is working. Upon selection of a record, the ERP application 110 and/or the toolset application 112 can generate and present additional tables relating to the selected record. In the illustrated example, selection of the "Customer Price Groups" item 308 causes the toolset application 112 to retrieve, parse, and expose the ERP metadata 118 corresponding to an application object that corresponds to the "Customer Price Groups" item 308.

It should be understood that it is not required that retrieval and/or parsing happens at selection time. In some implementations, retrieval and/or parsing are done during population of model tables. As such, selection as disclosed herein can include selecting and displaying the relevant rows in the prepopulated tables. In other implementations, a first selection may be retrieved and parsed, and data corresponding to the selections can be stored in the tables. As such, subsequent selections may only trigger re-retrieval and re-parsing if the object definition has changed since the previous selection of the application object. It should be understood that this embodiment is exemplary, and should not be construed as being limiting in any way.

In the illustrated embodiment, an elements table window 312 is presented. The elements table window 312 displays various data. More particularly, the data shown in each row can include a summary of information from the row in table 206 representing the element itself and information from certain identifier property values from related rows in table 208. In the illustrated embodiment, the identifier properties are the values of the property types called Name and Id, which are the only properties for this particular element. It should be understood that this embodiment is exemplary, and should not be construed as being limiting in any way.

In the illustrated view, the elements table window 312 illustrates a page, a number of actions, a number of controls, and a procedure that are included in the ERP metadata 118 that corresponds to the "Customer Price Groups" item 308 of the objects table window 302. As explained above with respect to the object table window 302, a user can select any of the elements displayed in the elements table window 312 to retrieve and display additional information relating to the selected element. In the illustrated embodiment, the user has selected the "GetSelectionFilter" procedure element, as indicated by the highlighted record indicator 310B at the edge of the record corresponding to the procedure element. In response to this selection, the ERP application 110 and/or the toolset application 112 can retrieve, format, and display additional ERP metadata 118 corresponding to the selected element.

A properties table window 314 corresponding to the selected "GetSelectionFilter" procedure element of the elements table window 312 is displayed. The properties table window 314 lists all properties defined for the element selected in the elements table window 312. In the illustrated embodiment, two properties are defined for the "GetSelectionFilter" procedure element. Additionally, a code table window 316 displaying program code corresponding to the element selected in the elements table window 312, in this case the "GetSelectionFilter" procedure, is displayed. In light of the structure set forth in FIG. 2, it will be appreciated that the properties table window 314 and the code table window 316 display data relating to the element selected in the elements table window 312, as the elements "own" the code and properties associated with the elements. In the code table window 316, some, none, or all program code associated with the selected element can be displayed.

According to various embodiments, the data displayed in the table windows 302, 312, 314, 316 are editable via UI controls built into the user interface 300. For example, a user can select a line of code, as shown by the selected record indicator 310D, and can edit the code in place in the code table window 316. Thus, it will be appreciated that the user interface 300 exposes the ERP metadata 118 to a user in a comprehensive, up-to-date, and easily accessible manner, thereby eliminating limitations created by storing all metadata in BLOBs. The meta-metadata 120 defining the ERP metadata 118 also can be exposed to a user in a tabularized format to extend the metamodel, as illustrated in FIG. 4.

In FIG. 4, a user interface 400 for exposing the meta-metadata 120 in tables is illustrated, according to the same and/or another exemplary embodiment. More particularly, the user interface 400 illustrated in FIG. 4 is configured to expose the meta-metadata 120 in a tabularized format for interaction by a user. As shown, a propertytypeusage table window 402 is presented to a user. The propertytypeusage table window 402 is illustrated as exposing meta-metadata 120 relating to the ERP metadata 118. For example, the propertytypeusage table window 402 can display meta-metadata 120 relating to a property displayed and selected in a properties table window such as the properties table window 314 illustrated in FIG. 3.

The propertytypeusage table window 402 exposes meta-metadata 120 indicating, for example, property types, element types, property names, element type names, and data types for tables and fields of the ERP metadata 118. These meta-metadata 120 indicate scope, content, types, names, and other aspects of data elements described by the ERP metadata 118, as explained above. As explained above with reference to FIG. 3, the propertytypeusage table window 402 can provide an interface for allowing in-place editing of the meta-metadata 120, in addition to providing the meta-metadata 120 in an easily accessible, comprehensive, and up-to-date tabularized format. Thus, a user can modify various aspects of the meta-metadata 120 including, but not limited to, the property types for tables and fields represented by the ERP metadata 118 via the propertytypeusage table window 402. It should be understood that the illustrated embodiment is illustrative and should not be viewed as being limiting in any way.

The illustrated user interface 400 also can include an elementhierarchytype table window 404. The elementhierarchytype table window 404 exposes meta-metadata 120 indicating the parent types and child types of parent and child relationships defined by the hierarchy table 210. Thus, the elementhierarchytype table window 404 can be used to expose meta-metadata 120 describing types of elements in parent/child relationships and container names for elements of the ERP metadata 118. In some embodiments, the elementhierarchytype table window 404 includes parenttype and childtype columns populated via lookups into the elementtype table 212 from parent and child, respectively. It should be understood that this embodiment is exemplary, and should not be construed as being limiting in any way. Furthermore, as explained above, the data in the elementhierarchytype table window 404 can be edited in-place, thereby allowing a user to view and/or modify the meta-metadata 120 associated with the ERP metadata 118. It should be understood that the illustrated elementhierarchytype table window 404, and the data presented therein, is exemplary.

Figure 5:
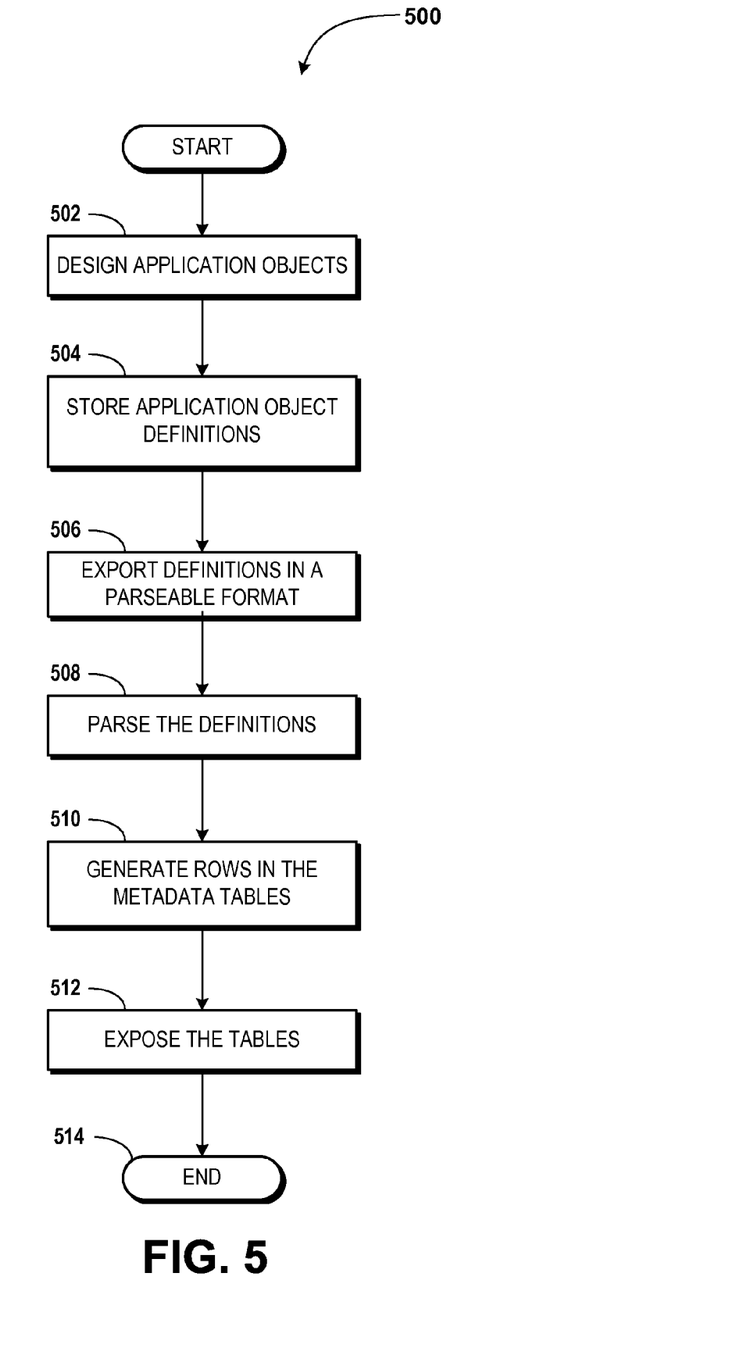
FIG. 5 is a flow diagram showing aspects of a method for exposing metadata, according to an exemplary embodiment.

Turning now to FIG. 5, aspects of a method 500 for exposing the ERP metadata 118 in a tabularized format will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods described herein, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by one or more applications executed by the ERP device 102. While particular applications are referred to herein with respect to some operations, it should be understood that these embodiments are exemplary, and should not be viewed as being limiting in any way. Additional and/or alternative applications can be executed by the ERP device 102 and/or other devices to provide the functionality disclosed herein without departing from the scope of the appended claims.

The method 500 begins at operation 502, wherein one or more application objects are designed. As explained above, the application objects can be designed by generating the application object definitions 117 via interactions with one or more UIs presented by the ERP design tool 108 and/or other applications associated with the ERP device 102. The application object definitions 117 can include, but is not limited to, data defining forms, reports, UIs, documents, letters, web pages, program code, applications, other application objects, and the like. As explained above, the structure and contours of data that can be entered into the application object definitions 117, can be described by the meta-metadata 120.

From operation 502, the method 500 proceeds to operation 504, wherein the ERP design tool 112 stores the application object definitions 117. The application object definitions 117 can be stored at a data storage device such as the data repository 114. According to various embodiments, the application object definitions 117 are stored in one or more formats that are proprietary to the ERP design tool 108 and the ERP application 110, and the application object definitions 117 is stored in one or more BLOBs that may be difficult to access and/or analyze for any purposes other than using the application object definitions 117 at runtime to provide ERP services.

From operation 504, the method 500 proceeds to operation 506, wherein the ERP design tool 108 exports the ERP metadata 118 in a parseable format 130. According to various embodiments, the ERP design tool 108 exports the application object definitions 117 in a text format, HTML, XML, and/or other formats that can be parsed to extract the elements representing the ERP metadata 118. It should be understood that the application object definitions 117 can be exported into any appropriate parseable format 130.

From operation 506, the method 500 proceeds to operation 508, wherein the toolset application 112 accesses and parses the parseable format 130. The toolset application 112 is configured to recognize data elements in the parseable format 130 and of the application object definitions 117. From operation 508, the method 500 proceeds to operation 510, wherein the toolset application 112 generates rows in one or more tables corresponding to the ERP metadata 118. In some embodiments, the toolset application 112 generates a number of rows in the tables, wherein some of the tables store the ERP metadata 118. It should be understood that his embodiment is exemplary, as the ERP metadata 118 can be stored individually or in combination in a single table and/or can be comingled in a number of tables.

From operation 510, the method 500 proceeds to operation 512, wherein the generated tables are exposed to the toolset application 112 and/or to the ERP application 110 in the same manner as if they were any other ERP data 116. The toolset application 112 can provide various functionality relating to the tables. For example, the toolset application 112 can execute UIs for presenting the ERP metadata 118 stored in the tables to users, enabling editing and/or insertion of new rows in the tables, and/or for other purposes, as illustrated and described above with reference to FIGS. 3-4. Thus, it should be understood that the toolset application 112 can provide a UI to allow a user to view, modify, create, delete, and otherwise interact with the ERP metadata 118 via interaction with the tables. Additionally, the toolset application 112 can store updated versions of the ERP metadata 118 in the data repository 114. From operation 512, the method 500 proceeds to operation 514. The method 500 ends at operation 514.

Although not illustrated in FIG. 5, it should be understood that the tables of the ERP metadata 118 can be exposed to other devices and/or applications for various purposes. For example, one or more applications can be configured to analyze the tabularized ERP metadata 118 to determine how users interact with the ERP services provided by the ERP device 102. Similarly, the ERP metadata 118 can be analyzed to provide information indicating how users modify the ERP data 116 and/or the application objects, as mentioned above. The ERP metadata 118 can be used to provide these, as well as other, insights into ERP service usage, if desired.

Figure 6:
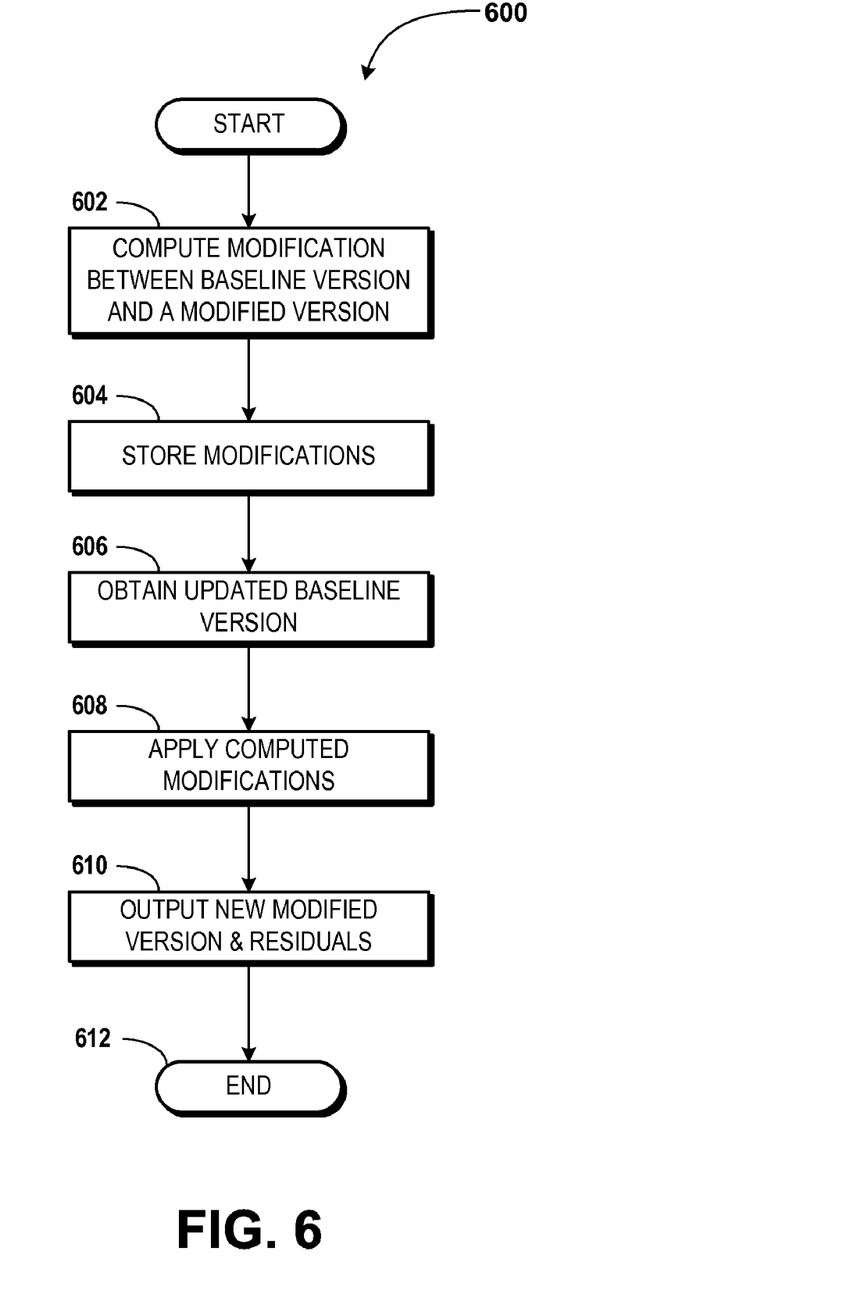
FIG. 6 is a flow diagram showing aspects of a method for using metadata and meta-metadata to compute and apply modifications to objects, according to an exemplary embodiment.

Turning now to FIG. 6, aspects of a method 600 for using ERP metadata 118 and or meta-metadata 120 exposed in a tabularized format to compute and apply modifications will be described in detail. For purposes of simplifying the description of the method 600, the method 600 will be described with respect to baseline and modified versions of a form. As explained herein, the exemplary form is merely illustrative of application objects, which are defined by the ERP metadata 118. It should be understood that modifications can be captured and/or applied to any desired application objects, which can be described by the ERP metadata 118. Thus, it should be understood that the described embodiment is exemplary, and should not be construed as being limiting in any way.

The method 600 begins at operation 602, wherein the toolset application 112 compares a baseline version of the ERP metadata 118 corresponding to the form to a modified version of the ERP metadata 118 corresponding to the form. As explained above, a user may modify the ERP metadata 118 corresponding to the form to tailor the form to suit the user's needs. For example, a user may add input fields to a form, remove input fields from the form, change the order of elements of the form, alter the caption of the form, change the length of one or more input fields of the form, and the like. Other modifications are possible and are contemplated. Furthermore, as explained in detail herein, the form is described by the ERP metadata 118. As such, the operations described herein with respect to the form can be performed with respect to one or more versions of the ERP metadata 118.

The toolset application 112 is configured to compare a modified version of the ERP metadata 118 corresponding to the form to a baseline version of the ERP metadata 118 corresponding to the form. Thus, the toolset application 112 compares the ERP metadata 118 of the modified and baseline versions of the form to identify changes made to the baseline version of the form. From operation 602, the method 600 proceeds to operation 604, wherein the toolset application 112 stores the identified modifications at the data repository 114 or other data storage device.

From operation 604, the method 600 proceeds to operation 606, wherein the toolset application 112 obtains an updated baseline version of the ERP metadata 118. The updated baseline version of the ERP metadata 118 can be received, for example, with a new version of an add-on, a new version of an ERP software package, via a download, or the like. For purposes of describing the disclosed embodiments, it is assumed that a user wishes to update the new version of the ERP metadata 118 in substantially the same manner the user modified the previous baseline version of the ERP metadata 118.

From operation 606, the method 600 proceeds to operation 608, wherein the toolset application 112 applies the modifications stored in operation 604. According to various embodiments, the toolset application 112 applies each of the modifications to the new baseline version of the ERP metadata 118. For example, if a user has modified a field of the form to change the input type from password to hidden, the toolset application 112 searches for the field in the new baseline version of the ERP metadata 118 and changes the input type for that field from password to hidden.

It will be appreciated that in some circumstances, the toolset application 112 may fail to make a change indicated by the modifications. For example, with respect to the field mentioned above, the toolset application 112 may fail to make the change if the field has been deleted, replaced, renamed, moved, or otherwise altered, and/or if the input type has been changed from password to another format. This example is illustrative, and should not be construed as being limiting in any way. The toolset application 112 is configured to track any modifications that are not implemented, to track data indicating why the modifications were not implemented, and to store the data as a residual. In some embodiments, the residuals may indicate that the modifications were not implemented or applied because the updated baseline version was determined heuristically to vary from the original baseline version more than a defined threshold, which can be set according to various considerations. As mentioned above, any changes that cannot be applied to the baseline version of the ERP metadata 118 can be copied from the modification into new application objects called "residuals." The residuals can be stored in a manner similar to other modifications, namely as application objects. It should be understood that this embodiment is exemplary, and should not be construed as being limiting in any way.

From operation 608, the method 600 proceeds to operation 610, wherein the toolset application 112 outputs the new modified version of the ERP metadata 118 and the residuals, if any. Although not illustrated in FIG. 6, the toolset application 112 and/or the ERP application 110 can present the residuals to a user, application, or other entity for action, if desired. The new modified version of the ERP metadata 118 can be stored at the data repository 114, if desired. The method 600 ends at operation 612.

It will be appreciated that the above-described concepts and technologies for exposing and using the ERP metadata 118 and the meta-metadata 120 allow users to easily access and modify the ERP metadata 118 and/or the meta-metadata 120 by simply adding, deleting, or modifying rows in the tables corresponding to the ERP metadata 118 and the meta-metadata 120. Additionally, the concepts and technologies disclosed herein allow users to interact with the ERP metadata 118 and/or the meta-metadata 120, for example to provide features such as the tracking and application of the modifications, as disclosed herein.

The concepts and technologies disclosed herein also enable support for data-driven transformations of the ERP data 116, the ERP metadata 118, and/or the meta-metadata 120 via interactions with the tabularized ERP metadata 118 and/or the meta-metadata 120. Similarly, the exposure of the ERP metadata 118 and the meta-metadata 120 as tables allows users and applications to interact with these data via custom applications and/or application programming interfaces ("APIs") designed to support working with these data. These and other uses for the exposed ERP metadata 118 and the meta-metadata 120 are possible and are contemplated.

In some implementations, the concepts and technologies disclosed herein also can be used to support modifications of modifications, and storage of the modified modifications as one or more rows in the ERP metadata 118. As explained herein, a modification can be stored as an application object having one or more properties stored as changes. According to various implementations, users are able to generate modifications of the modifications, and store the modifications of modifications as application objects that also are stored as rows in the ERP metadata 118. By way of example, a baseline version of an application object may include a form, and the form may include an element such as a textbox. The textbox may have a length specified as 30 characters. This property of the textbox can be stored in the ERP metadata 118.

A user or other entity may wish to modify the application object, and as such the ERP metadata 118, such that the textbox accommodates names or other input having more than 30 characters, for example. In such an example, a user may modify the length associated with the textbox to reflect a 60 character length instead of the 30 characters specified in the baseline version of the application object. According to various implementations, the modification of a property corresponding to the textbox length can be stored as an application object, and as such, as one or more rows in the ERP metadata 118, as explained herein. This, as explained hereinabove corresponds to a modification.

Another or the same entity may further determine that the modification, of the textbox length from 30 to 60, should itself be modified such that the length of the textbox is increased instead to a length of 70 characters. This type of modification is referred to herein as a modification of a modification, and are supported by the concepts and technologies described herein. More particularly, an entity can edit one line of the modification text associated with the modification described immediately above, modifying the textbox length from 30 to 60 characters, to change the 60 characters to 70 characters, parse the modification text into the tables of ERP metadata 118, and compute the difference between the baseline version and the modified version.

Thus, if another entity wishes to apply the modification of the modification to a baseline version of the ERP metadata 118, the other entity can obtain the baseline version of the ERP metadata 118. The modification to the modification, increasing the modified textbox length from 60 to 70 characters, can first be applied to the modification, increasing the textbox length from 30 to 60 characters. This application of the modification of the modification to the modification yields a new modification reflecting a change of the textbox length from 30 to 70. This new modification object can be applied to a most recent version of the baseline version of the ERP metadata 118 to provide a version of the application object having a textbox with a length of 70. It should be understood that this embodiment is exemplary, and should not be construed as being limiting in any way.

Figure 7:
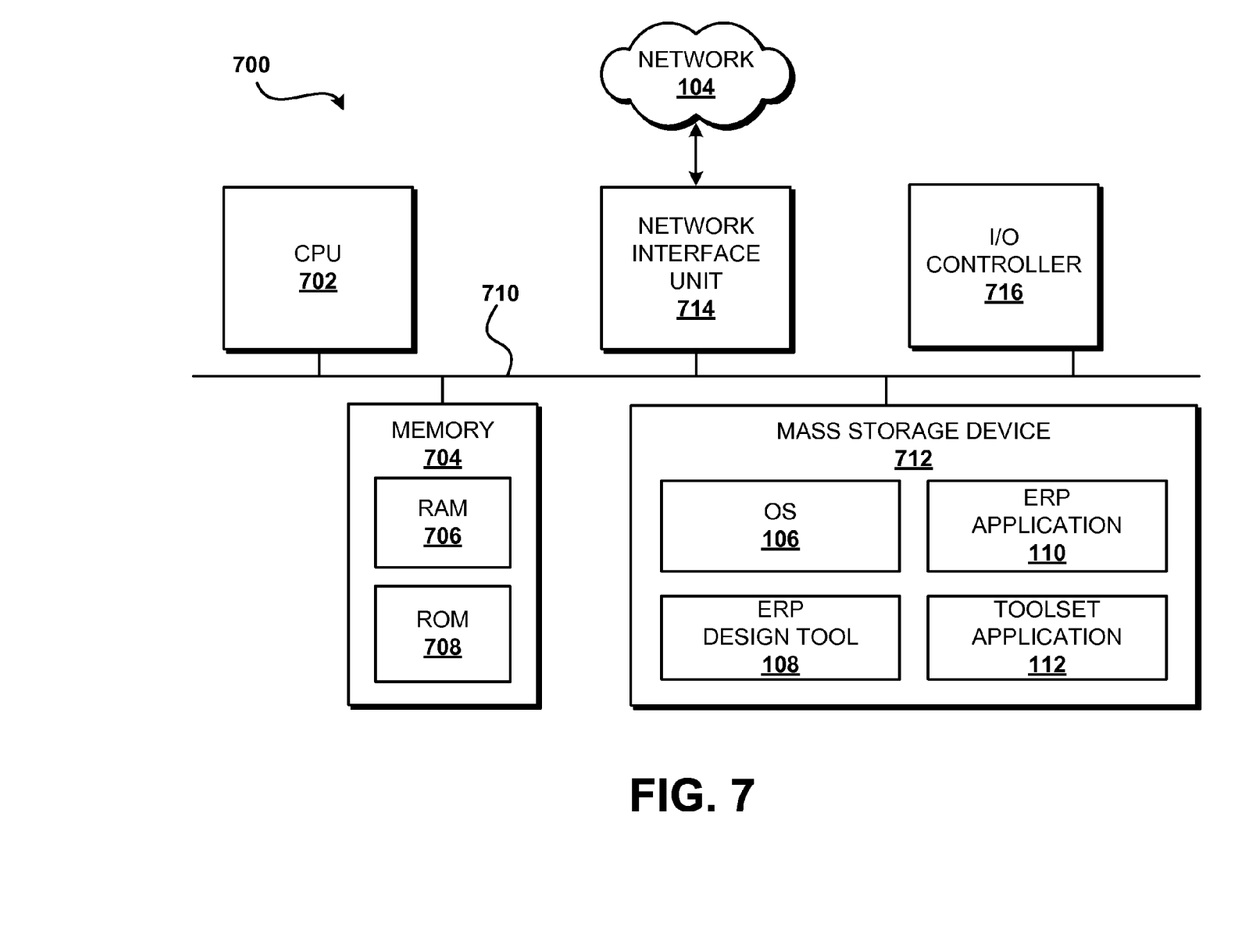
FIG. 7 is a computer architecture diagram illustrating an exemplary computer hardware and software architecture for a computing system capable of implementing aspects of the embodiments presented herein.

FIG. 7 illustrates an exemplary computer architecture 700 for a device capable of executing the software components described herein for exposing and using ERP metadata 118 and meta-metadata 120. Thus, the computer architecture 700 illustrated in FIG. 7 illustrates an architecture for a server computer, a desktop computer, a netbook computer, a tablet computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing the operating system 106, the ERP application 110, and the toolset application 112. Although not shown in FIG. 7, the mass storage device 712 also can be configured to store the meta-metadata 120, if desired.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 700 may operate in a networked environment using logical connections to remote computers through a network such as the network 104. The computer architecture 700 may connect to the network 104 through a network interface unit 714 connected to the bus 710. It should be appreciated that the network interface unit 714 also may be utilized to connect to other types of networks and remote computer systems, for example, the data repository 114. The computer architecture 700 also may include an input/output controller 716 for receiving and processing input from a number of other devices, including a keyboard, mouse, or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Based on the foregoing, it should be appreciated that technologies for exposing and using metadata and meta-metadata have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for exposing metadata and meta-metadata, the computer-implemented method comprising performing computer-implemented operations on metadata in a parseable format for:
   parsing the metadata to extract, based upon meta-metadata defining structure and constraints associated with the metadata, one or more elements of the metadata;
   populating one or more tables with detailed information of the one or more elements;
   exposing the tables;
   comparing a baseline version of the metadata to a modified version of the metadata; and
   storing a modification comprising data indicating one or more differences between the baseline version of the metadata and the modified version of the metadata, the modification being stored as one or more new rows in the tables,
      wherein the modification comprises an application object comprising properties describing one or more changes to the baseline version of the metadata, wherein a format of the modification is defined by meta-metadata describing a notion of the modification, and wherein the application object is generated based, at least partially, upon the meta-metadata describing the notion of the modification.

2. The method of claim 1, wherein the metadata in the parseable format is received from an enterprise resource planning device executing an enterprise resource planning application.

3. The method of claim 2, wherein the metadata in the parseable format describes an application object obtained by:
   accessing the enterprise resource planning device;
   interacting with an enterprise resource planning design tool to design the application object; and
   generating the application object using a user interface presented by the enterprise resource planning device.

4. The method of claim 1, further comprising:
   modifying the modification to obtain a different modification; and
   storing the modification of the modification by storing data in the one or more rows in the tables in accordance with the modification of the modification.

5. The method of claim 1, further comprising:
   obtaining an updated baseline version of the metadata;
   applying the modification to the updated baseline version of the metadata; and
   outputting a new modified version of the metadata.

6. The method of claim 1, further comprising:
   obtaining an updated baseline version of the metadata;
   applying the modification to the updated baseline version of the metadata;
   determining what part of the modification was not applied; and
   outputting a residual modification comprising a copy of the changes that was not applied.

7. The method of claim 6, further comprising storing the residual as one or more rows in the tables.

8. A computer storage medium having computer readable instructions stored thereupon that, when executed by a computer, cause the computer to:
   parse metadata in a parseable format to extract, based upon meta-metadata defining structure and constraints associated with the metadata, one or more elements of the metadata;
   populate one or more tables with detailed information of the one or more elements;

expose the tables;

compare a baseline version of the metadata to a modified version of the metadata; and store a modification comprising data indicating one or more differences between the baseline version of the metadata and the modified version of the metadata, the modification being stored as one or more new rows in the tables, wherein the modification comprises an application object comprising changes, wherein each of the changes comprises properties describing one or more changes to the baseline version of the metadata, wherein a format of the modification is defined by meta-metadata describing a notion of the modification, and wherein the application object is generated based, at least partially, upon the meta-metadata.

9. The computer storage medium of claim 8, further comprising instructions that, when executed by the computer, cause the computer to:

modify the modification to obtain a different modification; and store the modification of the modification by storing data in the one or more rows in the tables in accordance with the modification of the modification.

10. The computer storage medium of claim 8, further comprising instructions that, when executed by the computer, cause the computer to:

obtain an updated baseline version of the metadata;

apply the modification to the updated baseline version of the metadata; and output a new modified version of the metadata.

11. The computer storage medium of claim 8, further comprising instructions that, when executed by the computer, cause the computer to:

obtain an updated baseline version of the metadata;

apply the modification to the updated baseline version of the metadata;

determine what part of the modification was not applied; and output a residual comprising data indicating that a modification was not applied.

12. The computer storage medium of claim 11, further comprising instructions that, when executed by the computer, cause the computer to store the residual as one or more rows in the tables.

13. A computer storage medium having computer readable instructions stored thereupon that, when executed by a computer, cause the computer to:

design, via an enterprise resource planning design tool executing on an enterprise resource planning device, an application object, the application object being described by metadata stored in a data storage device;

execute a toolset application to parse the metadata to extract, based upon meta-metadata defining structure and constraints associated with the metadata, one or more elements of the metadata;

populate one or more tables with detailed information of the one or more elements;

expose the tables;

compare a baseline version of the metadata to a modified version of the metadata;

store a modification comprising data indicating one or more differences between the baseline version of the metadata and the modified version of the metadata, the modification being stored as one or more new rows in the tables;

modify the modification to obtain a different modification;

store the modification of the modification by storing data in the one or more rows in the tables in accordance with the modification of the modification;

obtain an updated baseline version of the metadata;

apply the modification to the updated baseline version of the metadata; and output a new modified version of the metadata.

14. The computer storage medium of claim 13, further comprising instructions that, when executed by the computer, cause the computer to:

determine if application of the modification to the updated baseline version of the metadata is successful or unsuccessful;

in response to determining that application of the modification to the updated baseline version of the metadata is successful, output a new modified version of the metadata; and in response to determining that application of the modification to the updated baseline version of the metadata is unsuccessful, output a residual comprising data indicating what part of the modification was not applied; and store the residual as one or more rows in the tables.

* * * * *